Feb. 5, 1957 A. WINTERS 2,780,200
SHAFT POSITIONING AND POSITION INDICATING APPARATUS
Filed March 4, 1954 2 Sheets-Sheet 1

INVENTOR.
ARTHUR WINTERS
BY P. E. Herminger

ATTORNEY

Feb. 5, 1957 A. WINTERS 2,780,200
SHAFT POSITIONING AND POSITION INDICATING APPARATUS
Filed March 4, 1954 2 Sheets-Sheet 2
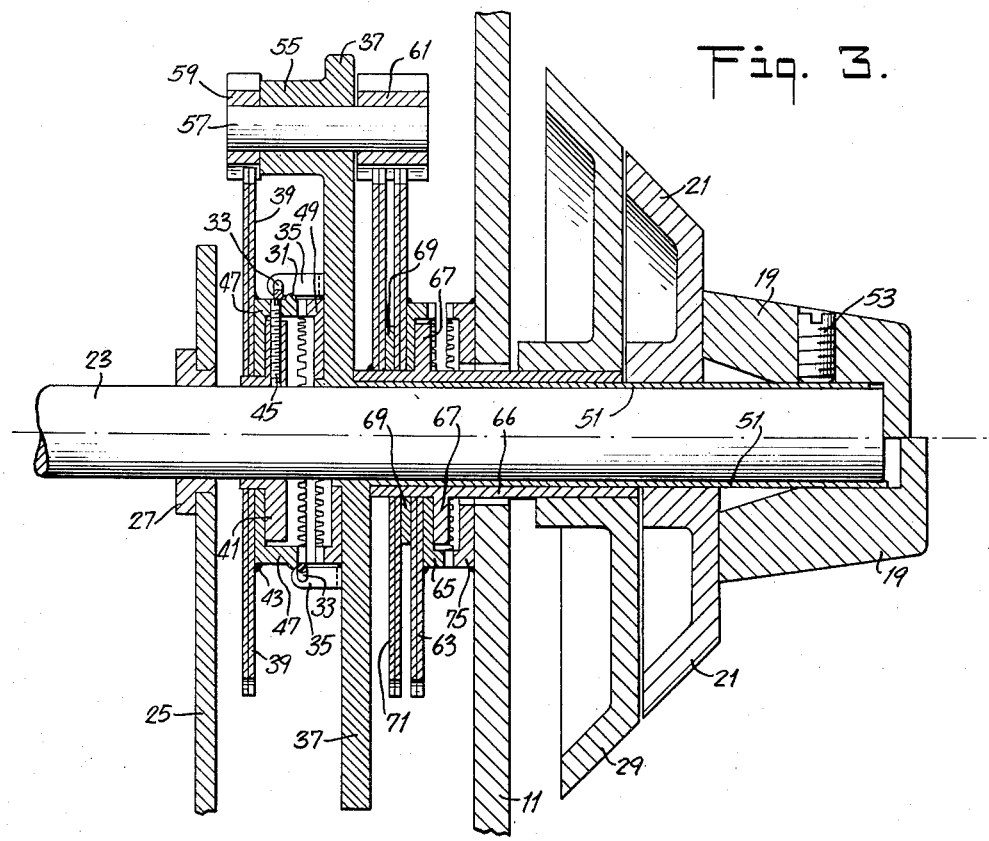
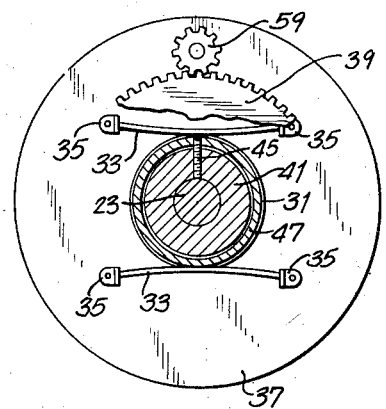
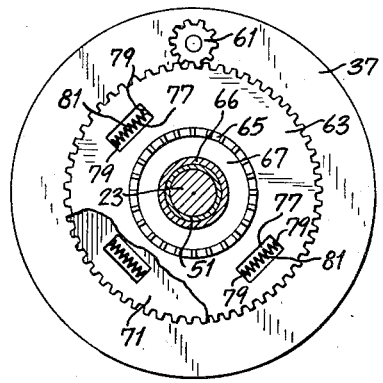
INVENTOR.
ARTHUR WINTERS
BY P.E. Henninger
ATTORNEY United States Patent Office 2,780,200
Patented Feb. 5, 1957

2,780,200

SHAFT POSITIONING AND POSITION INDICATING APPARATUS

Arthur Winters, Brooklyn, N. Y.

Application March 4, 1954, Serial No. 414,052

4 Claims. (Cl. 116—124)

This invention is concerned with a mechanism for rotatively positioning a shaft, or the like, with coarse and fine control thereof, and for indicating accurately the angular position of the shaft. More specifically, the rotational positioning device of this invention includes an input knob, or the like, which is both rotatable and axially shiftable between two positions. When the knob is in one axial position, the output shaft turns with it at the same speed and when the knob is in the other axial position, the output shaft turns with it at a substantially reduced speed, producing fine control rotational positioning of the output shaft in a very smooth and lash free manner. One indicator dial is provided which turns with the output shaft at all times, and another which turns with the knob. When the knob is turning at reduced speed, the latter dial provides an accurate indication on an enlarged scale, of very small angular movements of the output shaft.

An object of this invention is to provide a coarse and fine rotational positioning device having a superior construction for better control.

A further object of this invention is to provide an improved mechanism for indicating the angular position of a rotatable member.

Briefly, this invention embodies a coarse and fine rotational positioning device that comprises a rotatable input member axially shiftable between two positions, an output member positionable in rotation, means effective in one axial position of the input member to directly connect said output member to said input member to cause rotation of said output member at the same speed as the input member, and means effective in the other axial position of the input member and including a planetary movement for indirectly connecting said output member to said input member for fine rotational control of the output member. Two indicators are provided, both adjacent the knob, one turning with the speed of the output shaft and the other with the speed of the knob.

A specific embodiment of one mechanism according to this invention is described in detail herein and set forth by way of illustration in the drawings, in which:

Fig. 3 is a further enlarged divided, cross section view along the axis of the mechanism taken along the line 3—3 of Fig. 1. The top half of the figure shows the elements in the coarse control position, while the bottom half shows the elements in the fine control position.

Fig. 4 is an elevation, partly in cross section, taken along the line 4—4 of Fig. 2; and Fig. 5 is an elevation partly in cross section taken along the line 5—5 of Fig. 2.

Figure 1:
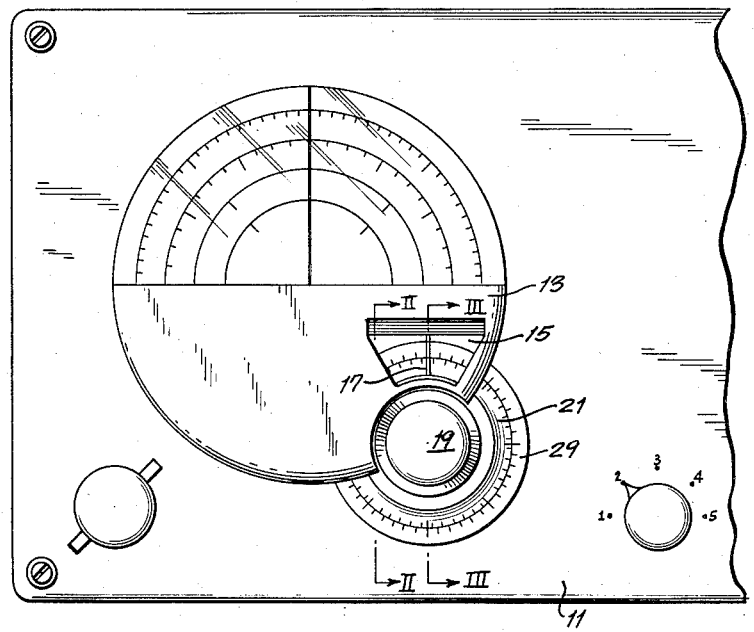
Fig. 1 is a fragmentary front elevation view of a radio panel, or the like, embodying the coarse and fine control elements of this invention.

In Fig. 1, the mechanism according to this invention is illustrated in connection with a radio panel, or the like, in which the mechanism output is employed to drive an output shaft which, in this instance, carries the usual variable condenser for tuning the radio. The illustration in Fig. 1 is merely to illustrate one use to which the mechanism may be put. However, the mechanism may have any number of other uses, which will suggest themselves to anyone skilled in the art.

Throughout the various figures of the drawings like reference numbers are employed to indicate like elements.

The mechanism according to this invention as shown in Fig. 1 is supported on the front of a panel 11 that also supports on the front thereof a masking element 13 having a window 15 therein with an index line 17 across the center thereof.

Figure 2:
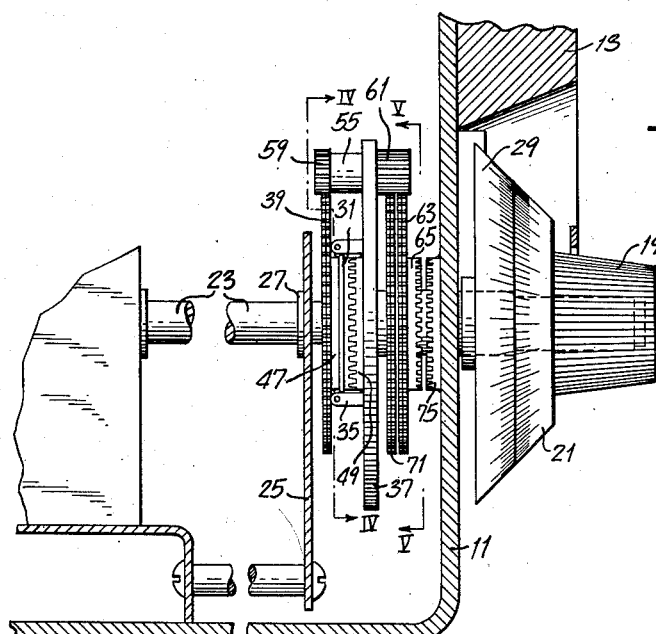
Fig. 2 is an enlarged side elevation showing the supporting framework in cross section, taken along the line 2—2 of Fig. 1.

Referring to Fig. 2, it will be observed that there is an input knob 19 having integral therewith a calibrated flanged element 21 that may have the usual truncated cone configuration. When the knob 19 is in the position illustrated in Fig. 2 there is a direct mechanical connection between the knob 19 and an output shaft 23 that may be used to drive any desired load. Attached to the bottom of panel 11, which is in the form of a chassis, is a supporting plate 25 that carries a bearing 27 for rotatably supporting the output shaft 23.

When the knob 19 is pulled outward from the panel 11, i. e., to the right as viewed in Fig. 2, the mechanism assumes its fine positioning control status, and rotation of the knob 19 together with the flanged element 21 will produce a greatly reduced, or fine, control in rotation of the output shaft 23 in a manner to be presently described. There is an indicator disc 29 that has a similar truncated cone configuration, as the flanged element 21, and which may contain any desired calibration markings. This indicator disc 29 will be rotated in exact correspondence with the rotation of output shaft 23 in a manner to be presently described, so that an indication of the position of shaft 23 may be had at all times.

It will be observed that there is a snap action position control mechanism for positively maintaining the device in one or the other of its two positions for coarse or fine control. This mechanism may take various forms, but that illustrated employs a ridge 31 that cooperates with a pair of arcuate shaped spring members 33 (see Fig. 4). These spring members 33 are supported at either end of each by a set of posts 35 which are firmly attached to, or integral with, a planetary gear-carrying disc 37 fixed on a sleeve 51 on which knob 19 is also fixed. The action of this snap acting mechanism will be obvious when it is pointed out that one position of the device is illustrated in Fig. 2 in which the knob 19 and associated elements including the disc 37 and posts 35 have been pushed to the left, as viewed in Fig. 2, causing the spring members 33 to snap over the ridge 31 to the position illustrated in Fig. 2. On the other hand, if the knob 19 is pulled outward from panel 11, i. e., to the right as viewed in Fig. 2, the spring members 33 will snap over the ridge 31 and end up to the right thereof (as viewed in Fig. 2) to hold knob 19, sleeve 51, and the elements which move axially with them in the other position. Such other position is illustrated by the lower half of Fig. 3.

Referring to Fig. 3 and describing the position of the mechanism for producing coarse control of the output shaft 23, the upper half of the drawing as illustrated in Fig. 3 shows the manner in which a direct positive connection is maintained between the knob 19 and the output shaft 23. Beginning at the shaft 23, it will be observed that there is a gear 39 that is securely fastened to a hub 41 in any convenient manner as by welding as illustrated at 43. This hub 41 is securely keyed, or otherwise attached for rotation with the shaft 23, as by means of a set screw 45. The hub 41 also carries a cup-shaped gear or clutch member 47 that is welded to the gear 39, or securely attached by any other convenient means. The set screw 45 extends through one edge of the cup-shaped gear 47 in order to fasten the gear 47 to the hub 41 for rotation therewith at all times.

In the position of the elements now being described, there is another cup-shaped gear or clutch member 49 that meshes with the cup-shaped gear 47 to complete a direct mechanical connection between these two gears. The cup-shaped gear 49 is securely attached, in any convenient manner as by welding illustrated, to the disc 37 at the center thereof. The disc 37 has integral therewith a sleeve 51 that is slidably carried outside of the output shaft 23 for free rotation relative thereto. The knob 19 is secured firmly to the sleeve 51 for rotation therewith by means of a set screw 53 as illustrated. Now it will be observed, that a rotation of the knob 19 will produce corresponding rotation of the disc 37 and gear 49 by means of the integral sleeve 51. When the knob 19 is in the axial position illustrated by the top half of Fig. 3, the gear 49 is meshed with its corresponding cup-shaped gear 47, and both rotate together. Then, because of the connections described, rotation of the cup-shaped gear 47 will cause the hub 41 to rotate therewith and because of the connection between hub 41 and the output shaft 23 this rotation will be transmitted directly to the output shaft 23. Consequently, rotation of the knob 19 will produce a direct and corresponding rotation of the shaft 23.

When the knob 19 is in the other axial position as illustrated by the lower half of Fig. 3, a fine rotational control for the output shaft 23 will be had. This fine rotational control may be traced beginning at the knob 19, through the sleeve 51 to the disc 37. The disc 37 carries near its periphery at least one hub 55, illustrated in the top half of Fig. 3. The hub 55 carries freely rotatable therein, a short shaft 57 that has securely attached to the extremities thereof a pair of planet gears or pinions 59 and 61. These planet gears are secured to the shaft 57 by any convenient means, e. g., having a press or shrink fit thereon, and rotate as a unit with the shaft 57 and one another, without any slippage. Only one such hub, shaft and planet gear assembly is employed in the illustrated embodiment, but any convenient number of such assemblies might be employed, as will be obvious as the description proceeds.

There are a gear 63 and a clutch member or gear 65 that are securely fastened together as by welding, and that are carried in a freely rotatable manner by an outer sleeve 66 which, in turn, is freely rotatable about the sleeve 51. The gears 63 and 65 are held in position with regard to longitudinal movement on sleeve 66 by means of a flange 57 on that sleeve and a spacing washer 69. It will be observed that there is another gear 71 located to the left of gear 63 (as viewed in Fig. 3) which is securely fastened to the outer sleeve 66 which in turn is integral with the flange 67. Consequently, the outer sleeve 66 will rotate with the gear 71. Secured in any convenient manner to the sleeve 66, for rotation therewith, is the indicator disc 29.

There is a cup-shaped gear or clutch member 75 that is secured to the panel or framework 11 in any convenient manner, as by the welding illustrated. This gear 75 matches and meshes with the cup-shaped gear 65 when the knob 19 is pulled out to the position illustrated in the lower half of Fig. 3. Therefore, the gear 63 is held stationary when the knob 19 is out in this "fine" control position.

When the knob 19 is rotated, it will carry the disc 37 around in a corresponding rotation and therefore cause the planet gear 61 to travel in translation around the periphery of stationary gear 63. Since the gear 63 is now held stationary, the gear 61 rotates about its own axis during this translation.

The other gear 71 which also meshes with the planetary gear 61 has a predetermined number of teeth, while the gear 63 has a given number less than the number of teeth in gear 71. This difference in number of gear teeth may be any given number, as desired, within the mechanical limits of such a construction. By reason of this difference in the number of gear teeth between gears 63 and 71, gear 71 will be rotated through a given angle by the action of the planet pinion 61 as it revolves once around the stationary sun gear 63. By way of example, I prefer to employ for the illustrated use, one less tooth in the gear 63 than the number of teeth in the gear 71. Therefore, in one complete revolution of the knob 19, and consequently of the disc 37 and of the planetary gear 61 in translation around its sun gear 63, the gear 71 will be caused to rotate in the same direction as the rotation of the knob 19, an angular displacement equal to the pitch of one tooth on the gear 71. This displacement of the gear 71 is transmitted directly via the sleeve 66 to the indicator 29 which rotates therewith.

It is to be noted that the fine adjustment given to the gear 71 and connected elements could be in either direction relative to the turning of input knob 19, depending upon whether gear 63 has more or less teeth than gear 71. The amount of adjustment, i. e., rotation, given to gear 71 may be varied depending on the difference in the number of teeth. The maximum adjustment that may be produced for a given rotation of the input, depends upon the mechanical limits as determined by the configuration of the teeth. One explanation of the adjustment action that is effectuated, is that the planetary pinion 61 maintains one tooth on sun gear 71 in alignment with one tooth on stationary sun gear 63. In this manner, as the pinion 61 walks around sun gear 63 and maintains each successive tooth on gear 71 in alignment with the successive teeth on gear 63, the gear 71 will be rotated in one direction or the other to maintain such alignment. This will produce rotation of the gear 71 in an amount equal to the difference in the pitch of the teeth of gears 63 and 71.

At the same time as the indicator 29 is given its fine control adjustments, or reduced rotation, the output shaft 23 is given the same rotation by means of a parallel system of gears corresponding to the planet gear 61 and its cooperating sun gear 71. The corresponding elements are the planet gear or pinion 59 which is secured to the short shaft 57 and rotates integrally therewith, the sun gear 39 that is welded to the hub 41 which in turn is fastened by set screw 45 to the output shaft 23. The gear 39 has the same number of teeth as gear 71, and the pinion 59 has the same number of teeth as pinion 61 with which it rotates in unison. Consequently, it will now be evident that as the disc 37 is rotated by means of the knob 19 and causes the gears 61 and 59 to be rotated around the periphery of the now stationary sun gear 63, each of the gears, i. e., 71 are preferably constructed as illustrated, for purposes of eliminating play or back lash in the gears, by having two layers or identical gears that may rotate relatively to one another. In this manner and by means of employing cut out sections or windows 77 (see Fig. 5) which have a single finger 79 on each gear layer, at the opposite end of each window in order to support a compression coil spring 81 thereon, the two layers of each gear will be biased for relative rotation so that the corresponding engaged tooth of each layer will press against the opposite sides of the engaging teeth of the pinions 59 and 61 and eliminate any play that would cause back lash which is a familiar phenomenon in gear trains. In other words, the two layers of each of these gears are spring biased to produce a tooth that tends to extend against the meshing teeth of each of the pinions 59 and 61. In this manner, play or back lash is taken up by the spring biasing effect of the springs 81 which maintain contact of the teeth on each of the gears 39, 63 and 71, with the corresponding teeth of pinions 59 and 61.

Operation

The operation of the mechanism according to this invention may be briefly reviewed in connection with Fig. 3. When the knob 19 is pulled out, i. e., to the right as viewed in Figs. 2 and 3, the elements will assume the position illustrated in the lower half of Fig. 3 and the cup-shaped gear 65 will be meshed with the corresponding gear 75 that is securely fastened to the panel 11. When the knob 19 is rotated in either direction, the inner sleeve 51 will be rotated therewith and consequently the disc 37 likewise will be rotated a corresponding amount. Rotation of the disc 37 will carry the planetary pinions 59 and 61 around the periphery of their meshing sun gears 63, 71 and 39. This translation of planetary pinions 61 and 59 will produce rotation thereof during such translation, since the sun gear 63 is now held stationary by means of being directly connected to the panel 11. However, since the number of teeth in the stationary sun gear 63 is less than the number of teeth in the rotatable sun gears 71 and 39, a rotation of the sun gears 71 and 39 will be produced in an amount that depends upon the difference in the number of teeth. As explained above, in the illustrated embodiment of this invention, this difference is one tooth. Consequently, during one revolution of knob 19, the gears 71 and 39 will be rotated in the same direction through an angular displacement equal to the pitch of one tooth. This reduced rotation of gears 39 and 71 produces a corresponding rotation of the output shaft 23 and the indicator disc 29, by means of the direct mechanical connections previously traced from gear 39 to shaft 23, and from gear 71 to indicator 29.

In the other position of the knob 19, i. e., when the knob is pushed in (to the left as viewed in Figs. 2 and 3) the elements will take the position illustrated in the top half of Fig. 3. When the knob 19 is rotated while in this position, the sleeve 51 will be correspondingly rotated as before which will rotate the disc 37 and the gear 49. Since the gear 47 is now meshed with the gear 49, the output shaft 23 will be rotated directly a corresponding amount, because of the direct mechanical connection from gear 47 to the output shaft 23.

While a single embodiment of the invention has been described in detail in accordance with the applicable statutes, this specification is not to be taken in any way as limiting the invention but merely as being descriptive thereof.

It is claimed:

1. A coarse and fine rotational positioning and indicating device comprising a rotatable input member shiftable axially between two positions, a rotatable output shaft having a first gear and a clutch member connected thereto for rotation therewith, means for directly connecting said input member to said clutch member when the input member is in one position, indirect means including a planet gear meshing with the first gear, means for translating said planet gear in a circular path around said first gear including a connection with said input member when in its other position, means for controlling the rotation of said planet gear during its translation in order to cause a predetermined fine rotational adjustment of said output shaft, and indicating means driven in correspondence with said said output shaft for indicating its position.

2. A coarse and fine rotational positioning and indicating device comprising a rotatable input member shiftable axially between two positions, a rotatable output shaft having a clutch member and a first gear connected thereto for rotation therewith, a corresponding clutch member directly connected to said input member and meshing with said first named clutch member when the input member is in one axial position for directly rotating said output shaft, over the center means for maintaining said input member in one or the other of said two positions, indirect means including a planet gear meshing with said first gear, means for translating said planet gear in a circular path around said first gear including a direct connection with said input member, a first indicator integral with said input member for rotation therewith to indicate input motion, means for determining the amount of rotation of said planet gear during the translation thereof including a corresponding planet gear connected to for rotation with said first named planet gear, a stationary sun gear meshing with said corresponding planet gear when the input member is in the other position, said stationary sun gear having a different number of teeth from said first gear in order to control the rotation of said planet gears so that the output shaft will be rotated by an amount determined by the difference in pitch of the two gears having a different number of teeth from one another; and a second indicator for indicating the position of the output shaft comprising a gear corresponding to said first gear, said corresponding gear having the same number of teeth as said first gear and being in mesh with said corresponding planet gear, and an indicator disc connected to said corresponding gear for indicating the position of the output shaft at all times.

3. A shaft positioning and shaft position indicating device, comprising a rotatable shaft to be angularly positioned, a first gear fixed on said shaft for rotation therewith, a first clutch member fixed on said shaft for rotation therewith, a first sleeve rotatable on said shaft and translatable thereon axially between two positions, an element fixed on said sleeve and projecting radially beyond the periphery of said gear, a pinion shaft journaled in said member radially beyond the gear periphery, a pinion fixed on said pinion shaft and having an axial length sufficient so that it engages said gear in both axial positions of the sleeve, a second clutch member fixed on said sleeve and facing said first clutch member, said clutch members being engaged in a first of said two axial positions of the sleeve, and disengaged in the second of said positions, a knob fixed on said sleeve for rotating it and moving it angularly, a first indicator fixed on the sleeve adjacent the knob, said knob and indicator being axially spaced along said sleeve from said member, and on the opposite side of said element from said gear, clutch members and pinion, a second sleeve rotatably encircling said first sleeve and between said element and said first indicator, said second sleeve being held against axial movement on said first sleeve so that the two sleeves move axially together, a second pinion fixed on said pinion shaft and located on the opposite side of the member from said first pinion, a second gear fixed on said second sleeve and engaging said second pinion, said first and second gears having equal numbers of teeth, a second indicator fixed on said second sleeve and located adjacent said first indicator, a third gear rotatable on but axially movable with said second sleeve and engaging said second pinion, said third gear having a greater number of teeth than said first and second gears, a third clutch member fixed on said third gear for rotation and axial movement therewith, a stationary member, and a fourth clutch member mounted on said stationary member, said third and fourth clutch members being disengaged when said sleeve is in its first position and engaged when said sleeve is in its second position, said sleeve and said first and second clutch members cooperating when said sleeve is in its first position to turn the shaft at the same speed as the knob, said element, said pinion and said second gear then cooperating to drive said second indicator at the same speed as the knob, said third and fourth clutch members being effective when said sleeve is in its second position to lock said third gear against rotation, so that upon rotation of the knob and sleeve, the second pinion gear rolls around the periphery of the locked third gear, thereby advancing the first and second gears by an amount depending on the difference in pitch between the teeth of the third gear and the teeth of the first and second gears, the advancing movement of the first gear being transmitted to the shaft, and the advancing movement of the second gear being transmitted through the second sleeve to the second indicator.

4. A shaft positioning and shaft position indicating device, comprising a rotatable shaft to be positioned, a rotatable driving member shiftable axially between first and second positions, variable ratio gearing means connecting the driving member and the shaft, including means effective when the driving member is in said first position to establish a one-to-one ratio between the driving member and the shaft and means effective when the driving member is in the second position to establish a reduction in speed between the driving member and the shaft, and shaft position indicating means including a first indicator connected to the shaft for concurrent rotation at the same speed therewith, and a second indicator connected to the driving member for concurrent rotation at the same speed therewith, said indicators moving together when the driving member is in its first position and said second indicator moving at a faster rate than the first indicator when the driving member is in the second position, said second indicator then being effective to indicate on an enlarged scale the angular position of the shaft.

References Cited in the file of this patent
UNITED STATES PATENTS

| | | |
|---|---|---|
| 602,568 | Thunderbolt | Apr. 19, 1898 |
| 809,915 | Gabriel | Jan. 9, 1906 |